United States Patent [19]

Mohn et al.

[11] Patent Number: 5,183,567
[45] Date of Patent: Feb. 2, 1993

[54] APPARATUS FOR FILTERING AND SEPARATING FLOWING MEDIUM

[75] Inventors: Jürgen Mohn, Reinbek; Wilhelm Heine, Hamburg, both of Fed. Rep. of Germany

[73] Assignee: DT Membranfilter Vertriebs GmbH, Hamburg, Fed. Rep. of Germany

[21] Appl. No.: 817,887

[22] Filed: Jan. 6, 1992

[30] Foreign Application Priority Data

Sep. 13, 1991 [DE] Fed. Rep. of Germany ....... 4130481

[51] Int. Cl.⁵ .................... B01D 63/08; B01D 69/06
[52] U.S. Cl. .......................... 210/321.75; 210/321.84
[58] Field of Search ............... 210/634, 644, 321.6, 210/321.64, 321.72, 321.75, 321.84, 224, 231, 230, 227–229, 343, 344

[56] References Cited

U.S. PATENT DOCUMENTS 4,892,657 1/1990 Mohn et al.
5,069,789 12/1991 Mohn et al. .................... 210/321.84

Primary Examiner—Frank Sever
Attorney, Agent, or Firm—Robert W. Becker & Associates

[57] ABSTRACT

An apparatus for filtering and separating flowing medium by reverse osmosis, ultrafiltration, and microfiltration. Disposed in a closed housing is an element stack comprised of disk-shaped spacers and filter elements, with a respective filter element being disposed between each two spacers, about which the flowing medium flows. The housing has a spherical configuration.

13 Claims, 2 Drawing Sheets

5,183,567

APPARATUS FOR FILTERING AND SEPARATING FLOWING MEDIUM

BACKGROUND OF THE INVENTION

The present invention relates to an apparatus for filtering and separating flowing medium by reverse osmosis, ultrafiltration and microfiltration, and has a membrane or element stack that is disposed in a closed housing and is formed of disk-shaped spacers as well as filter elements, whereby a respective filter element is disposed between each two spacers, about which the flowing medium flows.

An apparatus of this general type is known (see applicants' U.S. Pat. No. 4,892,657). With this known apparatus, the housing is in the form of an essentially cylindrical tube, with the element stack being accommodated in a hollow space of the tube that is closed off at both ends by end members or flanges that are sealed relative to the inner wall of the tube. When dealing, for example, with flowing medium or unprocessed solution in the form of a no salt content water, but also, for example, with radioactively contaminated water, apparatus of this type must operate at very high pressures, for example in the range of from 10 to 15 bar. If the known apparatus having a tubular housing were to be operated at such pressures, the tube wall would have to be extremely thick to prevent the apparatus from bursting at pressures at which such processes are designed to be carried out. Additional stability enhancing measures might also have to be undertaken in the region of the end flanges or members in order to be able to confront these pressures. All of this results in considerable drawbacks, because taking such measures to make the apparatus pressure resistant makes the apparatus very expensive to produce, while at the same time considerably increasing the weight thereof, as a consequence of which the apparatus can no longer be used for a number of otherwise possible applications where the price-to-output ratio has now become too negative.

Apparatus of this type should be usable, for example, in great numbers on location, i.e. directly at the source of the contaminated flowing medium, and must in this connection also be easy to handle, yet must nonetheless be able to readily withstand high operating pressures.

It is therefore an object of the present invention to provide an apparatus for filtering and separating flowing medium of the aforementioned general type that has the ability to withstand high operating pressures in the range of 15 bar and greater, even during prolonged periods of use, that is also suitable for large quantity use due to its low manufacturing cost, that can also be used in very small plants where little space is available, and that is also suitable for recovering drinking water for human consumption and to meet hygiene requirements in the food industry.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
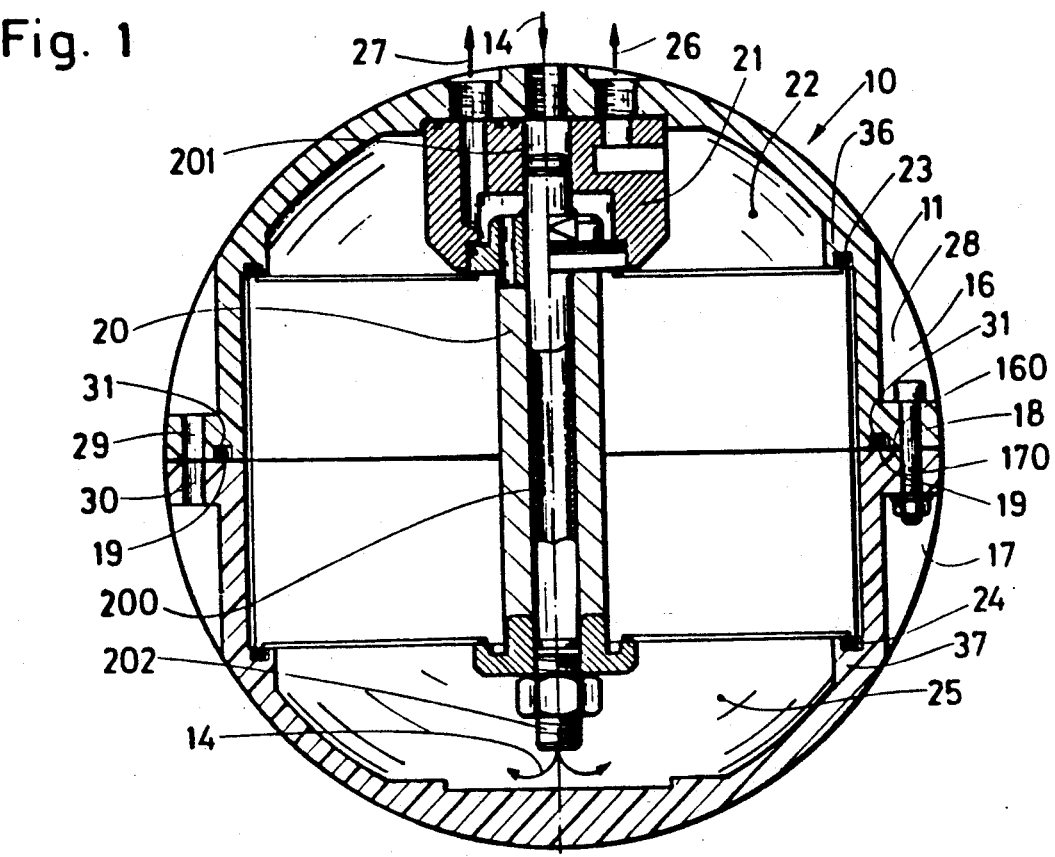
FIG. 1 is a cross-sectional side view of one exemplary embodiment of the inventive apparatus, which comprises two hemispherical housing portions.
Figure 2:
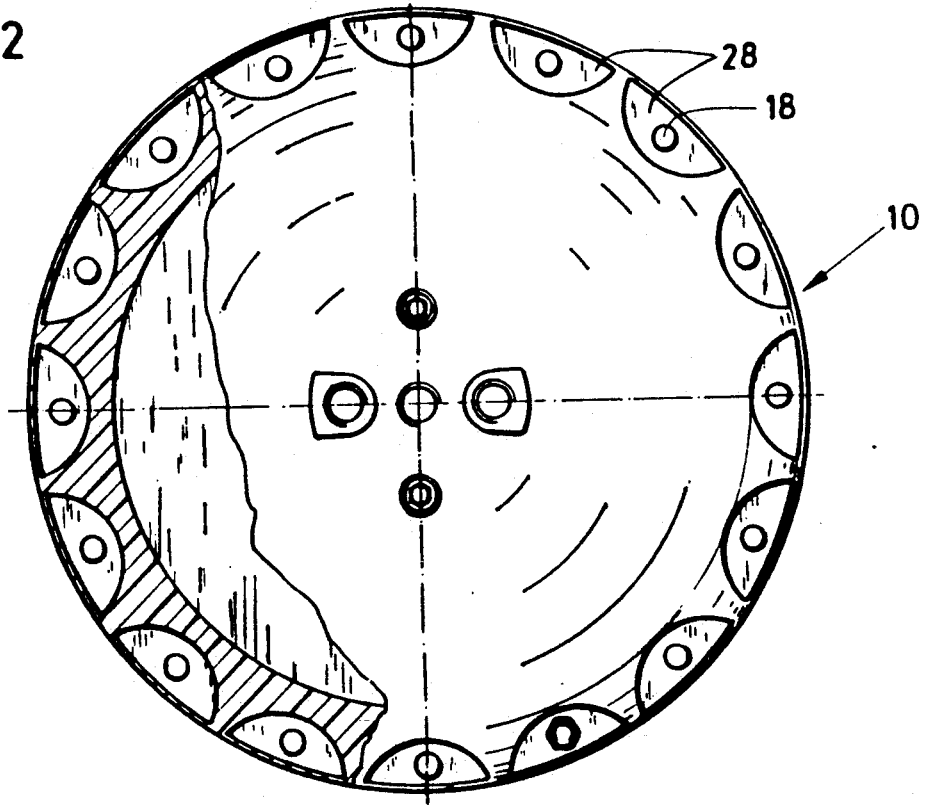
FIG. 2 is a partially cross-sectioned top view of the apparatus of FIG. 1.

The inventive apparatus for filtering and separating flowing medium comprises a closed spherical housing in which is disposed a membrane or element stack comprised of disk-shaped spacers and respective filter elements between each two spacers, about which the flowing medium flows.

The advantage of the inventive apparatus is essentially that due to the spherical configuration of the housing, this apparatus has an extremely high resistance to pressure, and the spherical housing can be produced very economically, especially since in contrast to the heretofore known tubular apparatus, no end members or flanges have to be provided, which have to be precisely manufactured, installed, and sealed. Due to the spherical construction of the housing, the inventive apparatus can also be accommodated with advantage in a very small space and can consequently be utilized at locations that could not utilize the heretofore known cylindrical housings, which additionally possibly also had to be reinforced in order to achieve a high resistance to pressure.

To ensure good accessibility of the element stack in the interior of the housing for manufacturing, maintenance and replacement purposes in a straightforward manner, the housing advantageously comprises two essentially hemispherical housing portions, which in addition have the advantage that they can be economically produced as very easy to form molded parts.

The hemispherical housing portions are advantageously held together by a plurality of releasable or removable connecting means that extend through recessed portions that are provided in the housing surface on both housing portions in the vicinity of their mutual contact surfaces.

Although it is in principle possible to construct the housing portions in the vicinity of their contact surfaces in such a way that at this location a fluid-tight housing is formed even at operating pressure, it has proven to be advantageous and economical to make it possible to seal the housing portions by providing a circumferential sealing means, such as an O-ring in the vicinity of the contact surfaces of these housing portions.

Pursuant to one advantageous specific embodiment of the present invention, the element stack, which in principle can be held together in the form of a stack in any desired manner, is held together by means of a clamping bolt that extends essentially through the central portion of the stack and that has a tubular configuration to permit the supply of unprocessed solution. The clamping bolt is in turn secured to the housing, and in particular in such a way as to enable a supply of unprocessed solution into an unprocessed solution entry chamber disposed in the interior of the housing. The clamping bolt that is advantageously provided here thus has at least the function of clamping the element stack together and of conveying the unprocessed solution that is to be separated into the unprocessed solution entry chamber, in other words simultaneously supplying the element stack with unprocessed solution and centrally holding the element stack together as such.

If with the inventive apparatus for example membrane pad type filter elements are used, the clamping bolt of the apparatus advantageously has at least one axially extending filtrate discharge channel means that, via a connector means disposed in the interior of the housing, is connected to the housing, for example via removable or releasable connecting elements such as screws or the like. In this case, the clamping bolt additionally advantageously also serves as a filtrate discharge or guidance member.

The retentate outlet chamber, which is formed between a designated side of the element stack and the housing of the apparatus, is advantageously also connected with the housing via a connector means, whereby the connector means into which the filtrate discharge channel opens can be identical with the connector means for connecting the retentate outlet chamber with the housing, and can hence be a single piece. Since the connector means is a single unitary component that serves a number of purposes, the manufacturing costs are still further reduced by using such a connector means.

Pursuant to a further advantageous specific embodiment of the inventive apparatus, the element stack is sealingly disposed in the housing in such a way that the unprocessed solution entry chamber that is disposed between the element stack and the housing has no direct communication with the retentate outlet chamber that is disposed between the element stack and the housing; in other words, no separate measures, such as an intermediate housing or the like, are necessary for accommodating the element stack in the housing in such a way as to ensure a separation between the unprocessed solution entry chamber and the retentate outlet chamber.

Sealing of the element stack relative to the housing is expediently effected by circumferential sealing rings that are disposed between the element stack and suitably formed shoulders or similar projections of the inner surface of the housing. Thus during assembly of the element stack in the interior of the housing, it is easy to effect sealing and hence separation of the unprocessed solution entry chamber and the retentate outlet chamber.

In principle, the housing can be made of any suitable material, such as a metallic material. However, taking into account the requirement for being able to produce the apparatus in an economical manner while at the same time providing for the ability to withstand high surface forces, it is advantageous to make the housing, i.e., the housing portions, of plastic; in this connection, ±t is particularly advantageous to use plastic that can be injection molded, since in this way the housing, i.e. the housing portions, can be economically mass produced in a single injection molding or extrusion process without the need for some type of post treatment.

Especially when taking into account the need for having the material of the housing be safe for the food industry, it is advantageous for this material to be acrylonitrile-butadiene-styrene (ABS) or polystyrene, which in addition are both capable of being injection molded and are acceptable for use in the food industry.

Further specific features of the present invention will be described in detail subsequently.

DESCRIPTION OF PREFERRED EMBODIMENTS

Referring now to the drawings in detail the apparatus 10 essentially comprises a spherical housing 11 that in the illustrated embodiment is in turn comprised of two essentially hemispherical housing portions 16, 17. The housing 11, i.e. the housing portions 16, 17, have predetermined wall thicknesses that are selected as a function of the anticipated operating pressure. The two housing portions 16, 17, in the vicinity of their contact surfaces 160, 170 and essentially parallel thereto, are provided with recessed portions 28, at the bases of which holes 29, 30 are provided in which extend respective connecting means 18 in the form of a bolt and nut for pressing the contact surfaces 160, 170 of the two housing portions 16, 17 together in a pressure tight manner. Provided in at least one of the housing portions 16, 17 in the vicinity of the contact surfaces 160, 170 thereof is a circumferential groove 31 in which is disposed a circumferential sealing means 19, for example an O-ring.

Figure 4:
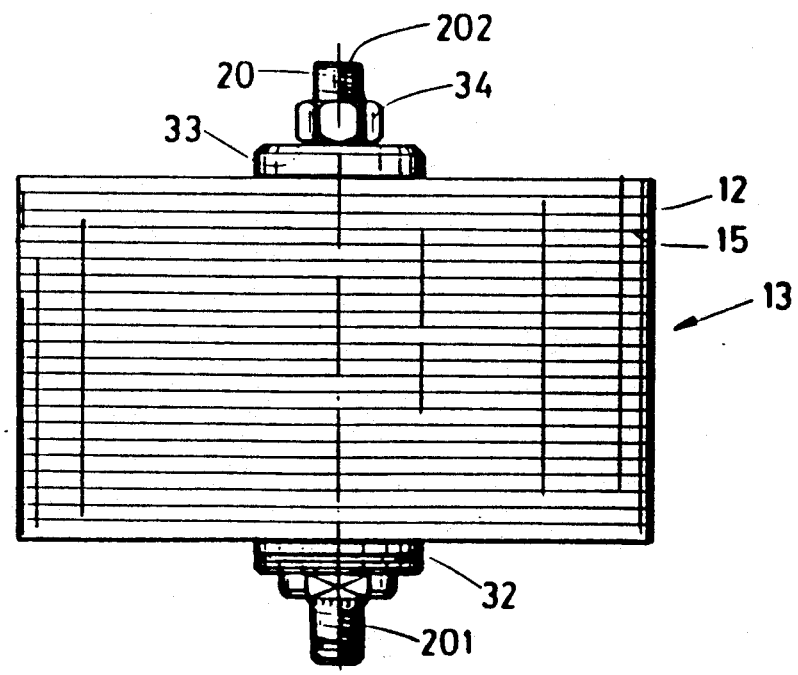
FIG. 4 shows the element stack that is disposed in the interior of the apparatus housing and is held together by the clamping bolt.

As can be seen in particular from FIG. 4, the membrane or element stack 13 is held together by a clamping bolt 20 that extends essentially centrally therethrough, with the clamping bolt holding the element stack together via disks or similar members 32, 33 that are disposed on both sides of the element stack and are pressed toward one another by a nut 34 that cooperates with the clamping bolt 20.

Disposed between respective ones of the disk-like spacers 12, which are known per se, is a respective filter element 15 about which flows the raw or unprocessed solution 14 (flowing medium); the arrangement of the spacers 12 and filter elements 15 is illustrated merely schematically in the drawings. Depending upon the construction of the spacers 12, the filter elements 15, which are generally so-called membrane pads, either have the unprocessed solution 14 flow thereabout in a meander-type fashion (series flow of the unprocessed solution 14 through the element stack 13) or is supplied with unprocessed solution 14 in a parallel manner (parallel supply of all filter elements 15 of the element stack 13). Combinations of series and parallel flowthrough are also conceivable.

Figure 3:
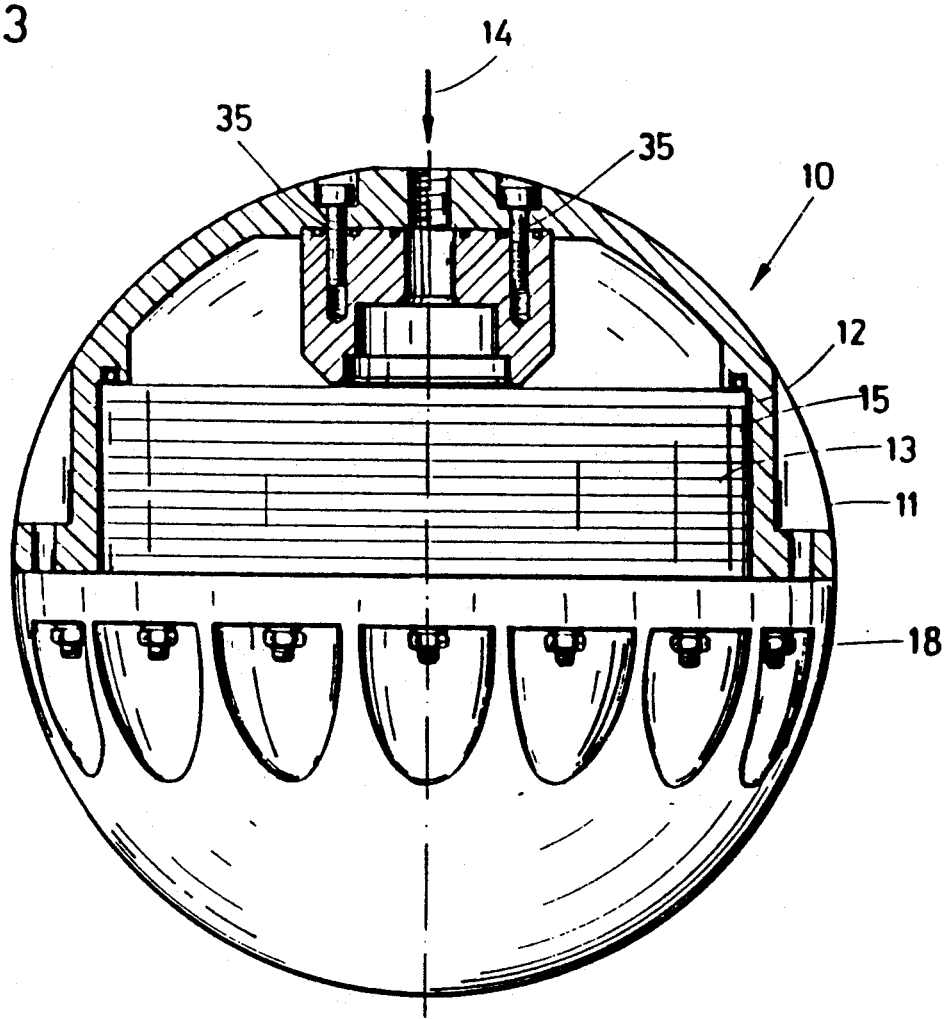
FIG. 3 is a side view of the apparatus of FIG. 1 rotated by 90°, with the upper hemispherical housing portion being cross-sectioned, and with the clamping bolt being left out.

As can be seen in particular from FIG. 1, the clamping bolt 20 is tubular with the tubular passage 200 serving for the supply of unprocessed solution 14 to the unprocessed solution entry chamber 25 in the interior of the housing 11. A connector means 21 is provided at a suitably formed inner surface of the upper hemispherical housing portion 16. This connector means 21, which in the illustrated embodiment is a one-piece molded part, not only provides a connection to the adjacent retentate outlet chamber 22 in the housing 11 or discharge of the retentate 26 from the apparatus 10, but also provides a connection for the discharge of the filtrate 27 out of the apparatus 10 to a region disposed about the clamping bolt 20, for example to a non-illustrated filtrate drainage channel that is formed on the clamping bolt 20 and into which the filtrate 27 supplied from the filter elements 15 is conveyed in a known manner. Furthermore, the connector means 21 sealingly carries the inlet end 201 for the unprocessed solution 14 (flowing medium) that is supplied to the apparatus 10 and is to be separated or filtered. The connector means 21 is connected, for example, via screws 35 (see FIG. 3).

An element stack 13 such as that illustrated in FIG. 4 is sealingly disposed in the housing 11, i.e. is disposed between the housing portion 16, 17, via sealing means 23, 24, and in particular in such a way that the unprocessed solution entry chamber 25 that is provided between the element stack 13 and the housing 11 has no direct connection to the retentate outlet chamber 22 that is provided between the element stack 13 and the housing 11, and unprocessed solution 14, after either a meander-type passage through the element stack 13 or after a parallel passage therethrough, can pass as retentate 26 into the retentate outlet chamber 22, but cannot do so directly. The sealing means 23, 24 are disposed in shoulders 36, 37 that essentially extend about the housing portions 16, 17 and are suitably formed therein: when the apparatus 10 is assembled as designed the element stack 13 rests sealingly against the shoulders 36, 37.

The actual separating process of the unprocessed solution 14 after entry into the apparatus 10 into retentate 26 and filtrate 27, which are separately discharged from the apparatus 10, utilizing filter elements 15 as such is known, so that it is unnecessary to discuss this process in any further detail.

The housing 11, i.e. the housing portions 16, 17, are made of a plastic that can preferably be injection molded. Thus, the housing portion 16, 17 can be economically produced, for example in a single step in a high pressure plastic injection molding or extrusion apparatus. The plastic, which in principle can be any suitable material, is preferably polystyrene or acrylonitrile-butadiene-styrene (ABS), which is safe for use in the food industry. The connector means 21 is preferably made of a metallic material, such as stainless steel or the like, which is similarly applicable for the clamping bolt 20, the disks 32, 33, as well as the nut and other connection elements that are not separately illustrated.

The present invention is, of course, in no way restricted to the specific disclosure of the specification and drawings, but also encompasses any modifications within the scope of the appended claims.

What we claim is:

1. An apparatus comprising: means for filtering and separating flowing medium by reverse osmosis, ultrafiltration, and microfiltration, including,
   a closed spherical housing in which is disposed an element stack comprised of disk-shaped spacers and respective filter elements between each two spacers, about which said flowing medium flows.

2. An apparatus according to claim 1, wherein said housing comprises two essentially hemispherical housing portions.

3. An apparatus according to claim 2, which includes a plurality of removable connecting means for holding said housing portions together.

4. An apparatus according to claim 3, in which said housing portions have respective cooperating contact surfaces; and which includes a circumferential sealing means for sealing said housing portions in the vicinity of said contact surfaces thereof.

5. An apparatus according to claim 3, which includes a clamping bolt that extends essentially centrally through said element stack and holds the same together, with said clamping bolt being secured in said housing and having a tubular configuration to effect a feeding of said flowing medium.

6. An apparatus according to claim 5, in which said clamping bolt has at least one axially extending filtrate discharge channel means, which is connected with said housing via a connector means.

7. An apparatus according to claim 5, wherein a retentate outlet chamber is provided between said housing and a first side of said element stack, and a connector means is provided for connecting said retentate outlet chamber to said housing.

8. An apparatus according to claim 7, wherein a flowing medium entry chamber is provided between said housing and a second side of said element stack for receiving said flowing medium from said clamping bolt, with said element stack being disposed in said housing in a sealed manner such that no direct communication exists between said entry chamber and said retentate outlet chamber.

9. An apparatus according to claim 8, which includes circumferential sealing rings to effect sealing of said element stack relative to said housing.

10. An apparatus according to claim 3, in which said housing is made of plastic.

11. An apparatus according to claim 10, in which said plastic is capable of being injection molded.

12. An apparatus according to claim 11, in which said plastic is selected from the group consisting of acrylonitrile-butadiene-styrene and polystyrene.

13. An apparatus according to claim 3, in which an outer surface of each of said housing portions is provided with a plurality of recessed portions, with said connecting means for holding said housing portions together being disposed in said recessed portions.

* * * * *